(12) United States Patent
Simmons

(10) Patent No.: US 7,022,758 B2
(45) Date of Patent: Apr. 4, 2006

(54) PRESS MOLDING COMPOUND

(75) Inventor: John Paul Simmons, Farmington Hills, MI (US)

(73) Assignee: The R. J. Marshall Company, Southfield, MI (US)

( * ) Notice: Subject to any disclaimer, the term of this patent is extended or adjusted under 35 U.S.C. 154(b) by 167 days.

(21) Appl. No.: 10/443,898

(22) Filed: May 22, 2003

(65) Prior Publication Data

US 2004/0236000 A1    Nov. 25, 2004

(51) Int. Cl.
*C08K 3/22* (2006.01)
*C08K 3/20* (2006.01)

(52) U.S. Cl. ..................................... 524/437

(58) Field of Classification Search ...................... None
See application file for complete search history.

(56) References Cited

U.S. PATENT DOCUMENTS

| | | | |
|---|---|---|---|
| 3,278,662 A * | 10/1966 | Mangrum | 264/77 |
| 3,847,865 A * | 11/1974 | Duggins | 524/437 |
| 3,925,300 A | 12/1975 | Roberts et al. | |
| 4,061,614 A | 12/1977 | Self | |
| 4,544,584 A * | 10/1985 | Ross et al. | 428/15 |
| 4,555,534 A | 11/1985 | Atkins | |
| 4,961,995 A * | 10/1990 | Ross et al. | 428/409 |
| 5,104,983 A | 4/1992 | Stock et al. | |
| 5,244,941 A * | 9/1993 | Bruckbauer et al. | 523/171 |
| 5,356,953 A | 10/1994 | Harada et al. | |
| 5,476,895 A * | 12/1995 | Ghahary | 524/437 |
| 6,265,467 B1 | 7/2001 | Koyanagi et al. | |
| 6,316,548 B1 | 11/2001 | Koyanagi et al. | |
| 6,348,538 B1 | 2/2002 | Buhl et al. | |
| 6,387,985 B1 * | 5/2002 | Wilkinson et al. | 523/171 |
| 6,497,956 B1 | 12/2002 | Phillips et al. | |
| 6,517,897 B1 * | 2/2003 | Bordener | 427/133 |
| 6,521,162 B1 | 2/2003 | Colley et al. | |
| 6,663,877 B1 * | 12/2003 | Appleton et al. | 424/411 |

* cited by examiner

*Primary Examiner*—Matthew A. Thexton
(74) *Attorney, Agent, or Firm*—Miller, Canfield, Paddock & Stone; Robert K. Roth

(57) ABSTRACT

A press molding compound is disclosed which comprises an uncured thermoset resin, a mineral filler and a cured thermoset resin. The ratio of uncured thermoset resin to mineral filler can be adjusted to maintain a desired specific gravity.

9 Claims, No Drawings

PRESS MOLDING COMPOUND

FIELD OF THE INVENTION

This invention relates to improvements to press or bulk molding compounds, and more particularly to improved press molding compounds suitable for use as solid surfaces, cultured marble, and the like.

BACKGROUND OF THE INVENTION

Press or bulk molding compounds (PMC) are thermosetting plastic resins often mixed with stranded reinforcement, fillers, and other additives into a viscous compound for compression or injection molding. Typical PMC formulas include an uncured polyester resin, chopped glass fibers, a catalyst, release agents, pigments, fillers and thickeners. These are then formulated by combining all the ingredients in an intensive mixing process, forming a material with a clay or dough-like consistency that can be molded directly. Molding of PMC can be accomplished by known compression and injection methods. For example, in compression molding, PMC is weighed and placed into an opened mold, the mold closes and the pressure of closing forces material throughout the mold. The molds are heated (to typically 250–300° F.) and the heat facilitates flow and cures the material. Such formed slabs of cured material can then be ground up into granules. Injection molding of PMC is accomplished by placing PMC into a feeder box or a funnel from which material is stuffed into an injector barrel and pushed by means of turning a screw into a molding chamber. Pressure of injection forces material throughout the mold. The mold is heated (250–300° F.) and the heat cures the material. PMC can advantageously be used to produce low-cost parts with a high level of precision, reproducibility, and allow for efficient production of high volumes. Examples of parts made with PMC granules include solid surfaces and cultured marble, which can be used as table and counter tops, covers, wall surfaces, etc.

However, with known PMC compounds, a thickener must be added to the uncured resin to achieve a desired specific gravity. Specific gravity of PMC materials must be controlled to ensure proper manufacture of parts. Known thickeners in use today include magnesium oxide.

It would be desirable to press molding compound which did not require the use of thickeners such as magnesium oxide.

SUMMARY OF THE INVENTION

In accordance with a first aspect, a press molding compound comprises an uncured resin, a mineral filler, and a cured resin. The cured resin can replace the need for separate thickeners and glass fibers.

From the foregoing disclosure and the following more detailed description of various preferred embodiments it will be apparent to those skilled in the art that the present invention provides a significant advance in the technology of filters for storm drains. Particularly significant in this regard is the potential the invention affords for providing a high quality, low cost, press molding compound. Additional features and advantages of various preferred embodiments will be better understood in view of the detailed description provided below.

DETAILED DESCRIPTION OF CERTAIN PREFERRED EMBODIMENTS

It will be apparent to those skilled in the art, that is, to those who have knowledge or experience in this area of technology that many uses and design variations are possible for the press molding compound disclosed here. The following detailed discussion of various alternative and preferred features and embodiments will illustrate the general principles of the invention with reference to press molding compound suitable for use in manufacture of granules for use in solid surfaces and cultured marble. Other embodiments suitable for other applications will be apparent to those skilled in the art given the benefit of this disclosure.

Known press molding compound (PMC) has comprised, for example: about 20% uncured thermoset resin (typically polyester and styrene), about 20% glass fibers, about 55% mineral fillers (typically aluminum trihyrdate) and about 5% magnesium oxide. This PMC is then mixed thoroughly to form a material with a clay like consistency. The clay like material can then be cut or extruded into logs, the logs pressed and heated into cured slabs, and the slabs can then be ground into granules. The granules can, in some preferred applications, be added to solid surfaces and other parts.

The term press molding compound can comprise one of several terms used in the art, including bulk molding compound, sheet molding compound, dough moulding compound, etc. The term thermoset resin is understood by those skilled in the art to mean a resin dissolved in another element with various additives included. For example, a thermoset polyester resin comprises a polyester resin dissolved in styrene with additives for ultraviolet radiation stabilization, as well as other additives, depending upon the intended application.

Preferably the PMC would have a specific gravity of about 1.7 to produce a material with clay-like consistency. The magnesium oxide has been added to known PMCs to adjust the specific gravity to this level, i.e., to thicken the PMC. In accordance with a highly advantageous feature, it has been determined that a ground, cured thermoset resin can be added to the uncured thermoset resin and the mineral filler to produce PMC having desirable properties, including specific gravity. Such ground, cured thermoset resin can even be a byproduct of the formation of granules from PMC.

Typically the uncured thermoset resin has a specific gravity below that of the mineral filler and above that of the cured thermoset resin, as the cured thermoset resin may contain some mineral filler. The cured thermoset resin may have a specific gravity which is about the same as the specific gravity of the mineral filler. By varying the ratios of materials, a desired specific gravity for the PMC may be dialed in.

Example: PMC is formed from 29.6% resin (uncured polyester), 50.4% aluminum trihydrate (so that the ratio by weight of the uncured resin to the mineral filler is about 37 to 63), and a cured thermoset resin comprising a thermoset polyester resin and mineral filler. The preferred ratio of cured thermoset resin to the total press molding compound by weight is 17–35%, and in this example is preferably around 20%. The cured thermoset resin is preferably ground to a diameter sufficiently small to penetrate a 145 Mesh. The resulting PMC has a specific gravity of 1.7. Optionally various pigments can be added in small amounts, typically 1–2% by weight, to produce a variety of color selections.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Granules formed from a press molding mixture comprising, in combination:
   an uncured thermoset resin;
   a mineral filler; and
   a cured thermoset resin;
   wherein the press molding mixture has a consistency which permits the mixture to be cut into or extruded into logs.

2. The press molding mixture of claim 1 wherein a ratio by weight of uncured thermoset resin to mineral filler is about 37 to 63.

3. The press molding mixture of claim 1 wherein the press molding compound has a specific gravity of about 1.7.

4. The press molding mixture of claim 2 wherein the cured thermoset resin comprises about 17–35% by weight of the mixture.

5. The press molding mixture of claim 2 where the cured thermoset resin comprises about 18–22% by weight of the mixture.

6. The press molding mixture of claim 1 wherein the cured thermoset resin has a specific gravity which is less than a specific gravity of the mineral filler.

7. The press molding mixture of claim 1 wherein the cured thermoset resin is ground to a diameter sufficiently small to penetrate a 145 Mesh.

8. The press molding mixture of claim 7 wherein the cured thermoset resin comprises a thermoset polyester resin and a mineral filler.

9. Granules formed from a press molding mixture comprising, in combination:
   an uncured thermoset resin;
   a mineral filler, wherein a ratio by weight of uncured thermoset resin to mineral filler is about 37 to 63; and
   a cured thermoset resin, wherein the cured thermoset resin comprises about 18–22% by weight of the mixture and the cured thermoset resin is sufficiently small to penetrate a 145 Mesh.

* * * * *